United States Patent
Ziv et al.

(10) Patent No.: US 11,226,667 B2
(45) Date of Patent: Jan. 18, 2022

(54) MICROCONTROLLER OPERABLE IN A BATTERY-LESS WIRELESS DEVICE

(71) Applicant: Wiliot, Ltd., Caesarea (IL)

(72) Inventors: Dotan Ziv, Tel Aviv (IL); Eli Sorin, Mitzpe Aviv (IL)

(73) Assignee: Wiliot Ltd., Caesarea (IL)

( * ) Notice: Subject to any disclaimer, the term of this patent is extended or adjusted under 35 U.S.C. 154(b) by 3 days.

(21) Appl. No.: 16/509,693

(22) Filed: Jul. 12, 2019

(65) Prior Publication Data

US 2020/0019226 A1 Jan. 16, 2020

Related U.S. Application Data

(60) Provisional application No. 62/697,133, filed on Jul. 12, 2018.

(51) Int. Cl.
*G06F 1/3206* (2019.01)
*G06F 1/3234* (2019.01)

(52) U.S. Cl.
CPC .......... *G06F 1/3206* (2013.01); *G06F 1/3275* (2013.01)

(58) Field of Classification Search
CPC .............................. G06F 1/3206; G06F 1/3275
See application file for complete search history.

(56) References Cited

U.S. PATENT DOCUMENTS

| | | | |
|---|---|---|---|
| 7,120,911 B1 | 10/2006 | Katayama | |
| 7,779,412 B2 | 8/2010 | Lin et al. | |
| 9,176,562 B2 | 11/2015 | Wit et al. | |
| 10,153,650 B2 | 12/2018 | Ni et al. | |
| 10,386,827 B2 | 8/2019 | Enver et al. | |
| 2003/0196127 A1 | 10/2003 | Olsen | |
| 2007/0106773 A1* | 5/2007 | Gallino | G06F 9/5072 709/223 |
| 2009/0254767 A1* | 10/2009 | Ford | G06F 1/3203 713/320 |
| 2010/0030791 A1 | 2/2010 | Iverson et al. | |

(Continued)

FOREIGN PATENT DOCUMENTS

| | | |
|---|---|---|
| CN | 102612675 A | 7/2012 |
| CN | 103914345 A | 7/2014 |

(Continued)

OTHER PUBLICATIONS

"Efficient Remote Software Execution Architecture based on Dynamic Address Translation for Internet-of-Things Software Execution Platform" Jung et al. 2015 18th International Conference on Network-Based Information System.*

(Continued)

*Primary Examiner* — Vincent H Tran
(74) *Attorney, Agent, or Firm* — M&B IP Analysts, LLC

(57) ABSTRACT

A system and method for executing a sequence of functions by at least one microcontroller operable in a battery-less internet of things (IoT) device. The IoT device includes: at least one microcontroller configured to execute one or more pre-programmed sequences; a sequencer configured to retrieve, from a cloud server, at least one flow, wherein the at least one flow indicates: an order of the pre-programmed sequences to be executed, and which of the at least one microcontroller are to execute each of the pre-programmed sequences; and an energy storage.

17 Claims, 4 Drawing Sheets

(56) References Cited

U.S. PATENT DOCUMENTS

| | | |
|---|---|---|
| 2010/0218005 A1 | 8/2010 | Jain et al. |
| 2010/0257529 A1 | 10/2010 | Wilkerson et al. |
| 2011/0029979 A1* | 2/2011 | Teshome ............... G06F 9/5094 |
| | | 718/103 |
| 2011/0246534 A1* | 10/2011 | Simon .................... G06Q 10/06 |
| | | 707/802 |
| 2011/0275331 A1 | 11/2011 | Wang et al. |
| 2012/0210150 A1 | 8/2012 | Wijngaarden et al. |
| 2012/0210325 A1 | 8/2012 | Wijngaarden et al. |
| 2012/0271478 A1* | 10/2012 | de Wit .................. G06F 1/3203 |
| | | 700/297 |
| 2013/0310998 A1* | 11/2013 | Banerjee ................. G06F 1/26 |
| | | 700/295 |
| 2014/0215236 A1 | 7/2014 | Heinrich et al. |
| 2015/0065037 A1* | 3/2015 | Burrell ............... G06K 7/10217 |
| | | 455/41.1 |
| 2015/0286262 A1 | 10/2015 | Park et al. |
| 2016/0054780 A1 | 2/2016 | Bodas et al. |
| 2016/0152200 A1* | 6/2016 | Craig ...................... H02J 3/14 |
| | | 701/21 |
| 2016/0231801 A1* | 8/2016 | Chandra ................ G06F 1/329 |
| 2016/0378169 A1 | 12/2016 | Naeimi et al. |
| 2016/0378565 A1* | 12/2016 | Che ...................... G06F 9/3887 |
| | | 718/105 |
| 2017/0068298 A1 | 3/2017 | Mishaeli et al. |
| 2018/0063797 A1 | 3/2018 | Thubert et al. |
| 2018/0321671 A1* | 11/2018 | Pistorius ............... G05B 19/409 |
| 2019/0020290 A1* | 1/2019 | Feng ...................... H02J 7/34 |
| 2019/0129493 A1 | 5/2019 | Li et al. |
| 2019/0173543 A1 | 6/2019 | Ganesan et al. |
| 2019/0178710 A1* | 6/2019 | Ahmed ................. G06F 1/3203 |
| 2019/0204900 A1 | 7/2019 | Nair et al. |
| 2020/0033832 A1* | 1/2020 | Meyer-Graefe ... G05B 19/4063 |

FOREIGN PATENT DOCUMENTS

| | | |
|---|---|---|
| CN | 106570585 B | 10/2019 |
| KR | 20060104386 A | 10/2006 |
| KR | 101898144 B1 | 9/2018 |
| WO | 2013123445 A1 | 8/2013 |

OTHER PUBLICATIONS

The First Chinese Office Action for Chinese Patent Application No. 2018800349004 dated Jul. 21, 2020, CNIPA, Beijing, China.
Calhoun, et al., "Battery-less Internet of Things (IoT) System-on-Chip (SoC)", Robust Lower Power VLSI, University of Virginia, Charlottesville, VA., 2015, url: https://rlpvlsi.ece.virginia.edu/battery-less-internet-things-iot-system-chip-soc-0.
International Search Report and Written Opinion of International Searching Authority for PCT/US2018/041596, ISA/RU, Moscow, Russia, dated Nov. 12, 2018.
The Second Chinese Office Action for Chinese Patent Application No. 2018800349004 dated Nov. 20, 2020, CNIPA, Beijing, China.
The European Search Report for European Patent Application No. 18832227.5, dated Dec. 15, 2020, EPO, Munich, Germany.
Communication Pursuant to Rule 114(2) EPC for European Patent Application No. 18832227.5, dated Dec. 15, 2020, EPO, Munich, Germany.
The Third Chinese Office Action for Chinese Patent Application No. 2018800349004 dated Jul. 21, 2020, CNIPA, Beijing, China.

\* cited by examiner

MICROCONTROLLER OPERABLE IN A BATTERY-LESS WIRELESS DEVICE

CROSS-REFERENCE TO RELATED APPLICATIONS

This application claims the benefit of U.S. Provisional Application No. 62/697,133 filed on Jul. 12, 2018, the contents of which are hereby incorporated by reference.

TECHNICAL FIELD

The present disclosure relates generally to microcontrollers, and more specifically to microcontrollers that operate without software stored in non-volatile memory.

BACKGROUND

In electronic devices, power consumption is often largely a function of processing power. Thus, increasing the processing power used by a system will likely increase the power consumed by the system. For many portable and smaller electronic devices where power access is limited, such as certain sensors or internet of things (IoT) devices, it is important to minimize power consumption.

To minimize power consumption, some available solutions include providing multiple processors or "execution functions" in a single device, each of which operates in a different power domain. Computing functions may include basic arithmetic gates, logical gates, control units, or input/output devices. Some of the computing functions may be trigged based on power events or scheduling events to further minimize the power consumption.

Conventional power consumption solutions and the architectures of the electronic devices assume that power may be limited but is always available, such as when the power source is a battery, so long as the battery has charge. As such, conventional power consumption solutions are designed to complete a processing task with minimum utilization of power without considering the power and energy required to perform each individual processing task. That is, it is assumed that there is always available power to complete an entire processing task. These solutions are not designed to consider the available energy at any given time, and in particular before executing a computing task.

In devices that operate at ultra-low power, including some IoT devices that are powered using energy harvesting, which captures small amounts of energy from the nearby environment, conventional power consumption solutions are often not viable, as energy is not always available and access to power for performing a processing task may be sporadic.

To reduce power consumption, such IoT devices are typically assembled with microcontrollers (also known as microcontroller units, or MCUs). A microcontroller offers the ability to control various devices with a reduced size unit compared to, for example, using a separate microprocessor. Microcontrollers generally include one or more CPUs, a memory, and input/output peripherals, and typically also include non-volatile memory (NVM) such as flash memory.

Although NVM provides a number benefits, its drawbacks can be particularly challenging to microcontroller applications. Specifically, flash and other NVMs are power intensive, require a significant allocation of space on a microcontroller, and increase the price of manufacture. Further, flash memory has a finite number of write-erase cycles that may result in failure if the device exceeds a threshold. Such a failure can often be unacceptable for certain uses, e.g., medical devices and other critical applications. Additionally, using a preprogrammed memory to execute instructions may make it difficult for an operator to update or change the settings or software of the microcontroller, especially if the microcontroller is being used remotely rather than near an operator. Conversely, operating a microcontroller solely using volatile memory (VM) is challenging, as any data stored within the VM will be lost when power is depleted.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a battery-less internet of things (IoT) device, comprising: at least one microcontroller configured to execute one or more pre-programmed sequences; a sequencer configured to retrieve, from a cloud server, at least one flow, wherein the at least one flow indicates: an order of the pre-programmed sequences to be executed, and which of the at least one microcontroller are to execute each of the pre-programmed sequences; and an energy storage.

Certain embodiments disclosed herein also include a method for executing a sequence of functions by at least one microcontroller operable in a battery-less internet of things (IoT) device, including: retrieving, from a cloud server, at least one flow representing execution of one or more pre-programmed sequences, wherein the at least one flow includes an order of the pre-programmed sequences to be executed, and which of at least one microcontroller is to execute each of the pre-programmed sequences; determining which of the at least one flow is to be executed; and executing the at least one flow when it is determined that there is sufficient energy to execute the at least one flow.

Certain embodiments disclosed herein also include a non-transitory computer readable medium having stored thereon instructions for causing a processing circuitry to perform a process, the process including: retrieving, from a cloud server, at least one flow representing execution of one or more pre-programmed sequences, wherein the at least one flow includes an order of the pre-programmed sequences to be executed, and which of at least one microcontroller is to execute each of the pre-programmed sequences; determining which of the at least one flow is to be executed; and executing the at least one flow when it is determined that there is sufficient energy to execute the at least one flow.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be appar

DETAILED DESCRIPTION

Figure 1:
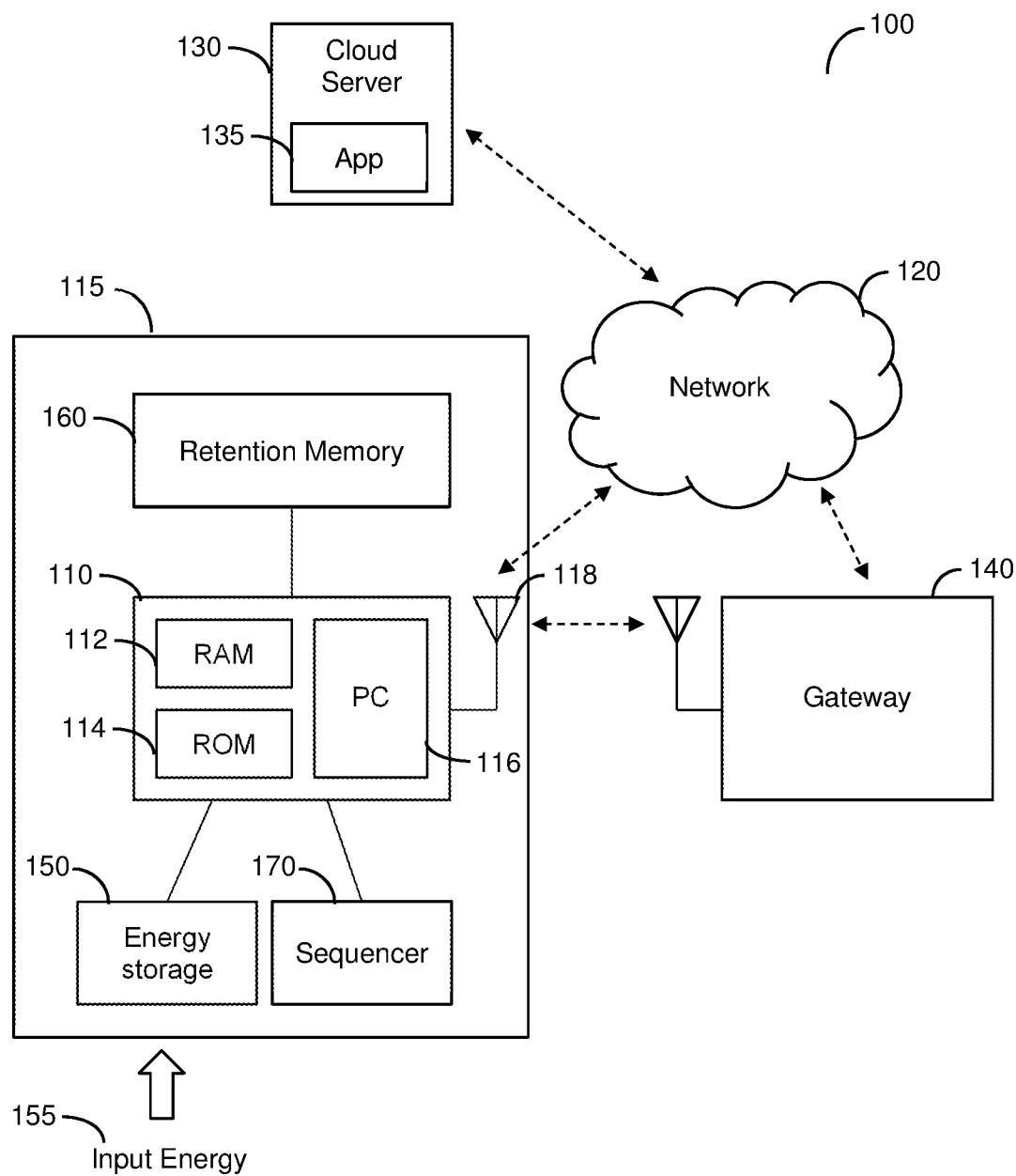
- FIG. 1 is a network diagram of a microcontroller system used to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an example network diagram 100 utilized to describe the various disclosed embodiments. As demonstrated in FIG. 1, an IoT device 115 communicates with a cloud server 130 and a gateway 140, e.g., via a network 120. In an embodiment, the IoT device 115 includes a microcontroller 110, an energy storage 150, a retention memory 160, and a sequencer 170.

The network 120 may be, but is not limited to, the Internet, the world-wide-web (WWW), a local area network (LAN), a wide area network (WAN), a metro area network (MAN), a combination thereof, and other networks capable of enabling communication between the elements of the gateway 140, the cloud server 130, and/or the IoT device 115. The gateway 140 and the IoT device may communicate over a local wireless network (e.g., BLE network, a Wi-F network) and the gateway 140 and the cloud server 130 can communicate over the Internet. In an embodiment, the IoT device 115 and the gateway 140 are not part of the same network.

In an embodiment, the network 120 is the Internet and the server 130 is a cloud server having installed thereon a cloud application 135, where the cloud application 135 is configured to allow communication between the IoT device 115 and the cloud server 130 via the network 120.

According to some embodiments, the cloud application 135 may be configured to send at least a portion of software to the IoT device 115 either directly through the network 120 or via the gateway 140. The portion of software may include instructions, functions, both, and the like. Thus, the IoT device 115 can execute codes stored and accessed remotely from the server rather than, or in addition to, executing locally stored codes.

The microcontroller 110 of the IoT device 115 includes random-access memory (RAM) 112, read only memory (ROM) 114, and a processing circuitry 116, such as a central processing unit (CPU). Portions of software are stored in the RAM 112 as required by the IoT device 115. The ROM 114 may include previously loaded instructions for executing sequences of instruction (sequences) and for managing a protocol for receiving software instructions from the cloud server 130, the gateway 140, or both. The processing circuitry 116 is configured to execute the instructions of the RAM 112 and the ROM 114, as well as instruction received from the cloud server 130, thereby controlling an automatically controlled device (not shown), such as a sensor, and actuator, and the like.

The IoT device may further include a network interface 118 configured to allow for communications between the IoT device 115 and the cloud server 130 over the network 120, as well as between the IoT device 115 and the gateway 140. In an embodiment, the network interface 118 is a wired interface, such as an ethernet controller. In a further embodiment, the network interface 118 is a wireless interface, configured to send and receive data packets over a wireless connection, e.g., over an 802.11 WiFi protocol connection.

In an embodiment, the IoT device 115 is configured to execute one or more processes based on the amount of available energy. If a process needs to wait for a resource, it is assigned with a 'blocked' state. The process state is changed back to a 'wait' state when the process no longer needs to wait (in a blocked state). Once the process finishes execution, or is terminated, the process is removed instantly or is moved into the 'terminated' state.

In an embodiment, the IoT device 115 only consumes power required to execute one or more instructions of a process, e.g., a sequence, from the energy storage 150. The power consumption is limited to only the actual power required to execute that particular process currently being executed.

The energy storage 150 is charged with energy provided by energy harvested using an energy harvester (not shown). The energy can be harvested from any external sources (or over-the-air signals), such as radio signals, solar power, piezoelectric signals, and the like. The harvested energy is stored in the energy storage 150. The energy storage 150 may be realized as a capacitor, a battery, an on-die capacitor, and the like.

In an embodiment, the retention memory 160 is a centralized area in the IoT device 115 that is constantly powered. Data meant to be retained during low power states may be saved to the retention memory 160. In an embodiment, the retention memory 160 is optimized to subthreshold or near threshold voltage, e.g., 0.3V-0.4V. This allows for the reduction of the leakage of the retention cells.

According to the disclosed embodiments, a process executed by the IoT device 115 can load its state or context from the retention memory 160. Further, a process executed by the IoT device 115 may also write its context or processed data in the retention memory 160. Always powering the retention memory 160 ensures that data is retained, even in the event that the other components of the microcontroller system 100 are powered off, e.g., when power is not available. The retention memory 160 can be realized using flip-flop, latches, or SRAM optimized for minimized power leakage.

In an example embodiment, the retention memory 160 contain the following types of retention data: software retention maintaining static calibration and information needed for the full flow execution; hardware retention maintaining dynamic parameters temporary variables, and data packet to retain until data transmission; and microcontroller retention to maintain data utilized by the IoT device 115. It should be noted that the retention memory 160 may not be divided into retention banks, or can be divided to any number of banks, without departing from the scope of the disclosed embodiments.

The IoT device 115 architecture allows executing a portion of a complete processing flow over several subroutines of a process based on the available energy. In an embodiment, before executing a process, or a portion thereof, the amount of available energy in the energy storage 150 is retrieved to determine if there is enough available energy to execute and complete the process. If there is sufficient energy, the process or portion thereof is scheduled for execution. To this end, the IoT device 115 may be configured with energy requirements for each function and subfunction, or sequence, to be executed. The energy requirements may indicate, for example, an upper bound of energy that would be consumed by the function or subfunction.

In another embodiment, a scheduler (not shown) is configured to automatically save the context of any executed operation to the retention memory 160 when the voltage level at the energy storage 150 reaches a predefined threshold, e.g., $V_{STOP}$. In the next execution cycle for the same process, its' context is retrieved from the retention memory 160, and execution continues from where it stops.

Once a process completes its execution, the results and/or output are written to the retention memory 160, and the IoT device 115 is powered off to enable maximal power saving. However, as noted above, the retention memory 160 may be configured to consume minimal power through static leakage. The energy storage 150 is charged with harvested energy, and a new execution cycle begins when there is sufficient energy stored and available. Then, a new process, or portion thereof, is scheduled for execution. Thus, the processing performed by the microcontroller system 100 is at the pace of charging the energy storage 150.

It should be noted that a process may be any function, procedure, method, sequence, flow, and the like executed by the IoT device 115 configured to perform a certain computing task, a controlling task, and the like. The process may be part of a program, application, and the like. A process may include one or more instructions. In an example implementation, instructions to be executed by the microcontroller system 100 may be divided into one or more atomic operations. The instructions may be part of software, firmware, middleware, microcode, hardware description language, and the such. Instructions may include code (e.g., in source code format, binary code format, executable code format, or any other suitable format of code).

In an embodiment, the scheduling processes or atomic operations for execution in response to the available energy is managed by the scheduler. The scheduling may be triggered by trigger signals, examples of which are provided below.

It should be noted that the particular architecture shown in FIG. 1 is merely an example and that other architectures may be equally utilized without departing from the scope of the disclosure. An energy-aware microcontroller is further discussed in patent application Ser. No. 16/032,547, currently pending and assigned to a common assignee, which is hereby incorporated by reference.

Figure 2A:
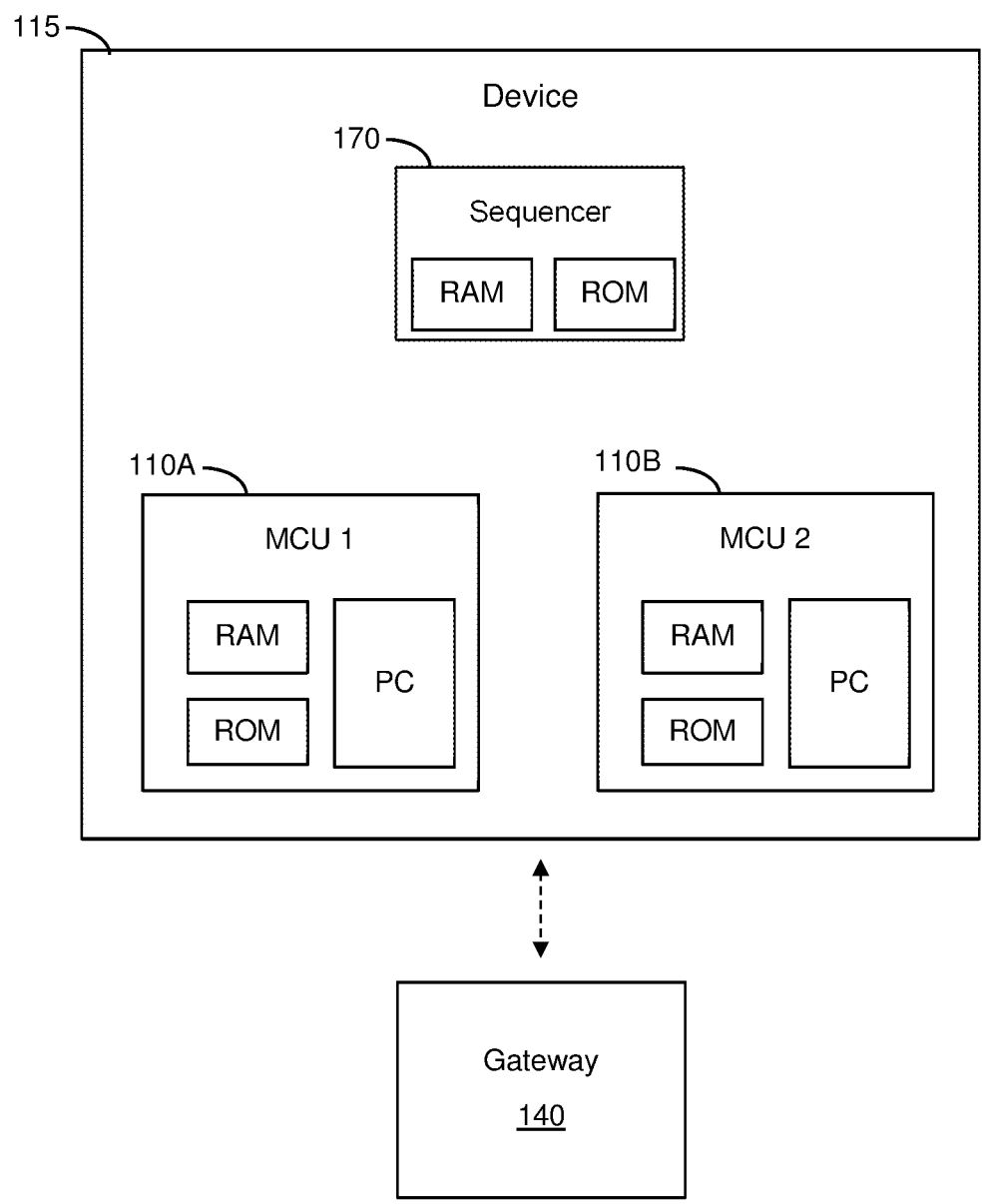
FIGS. 2A and 2B are block diagrams of a device according to an embodiment.
Figure 2B:
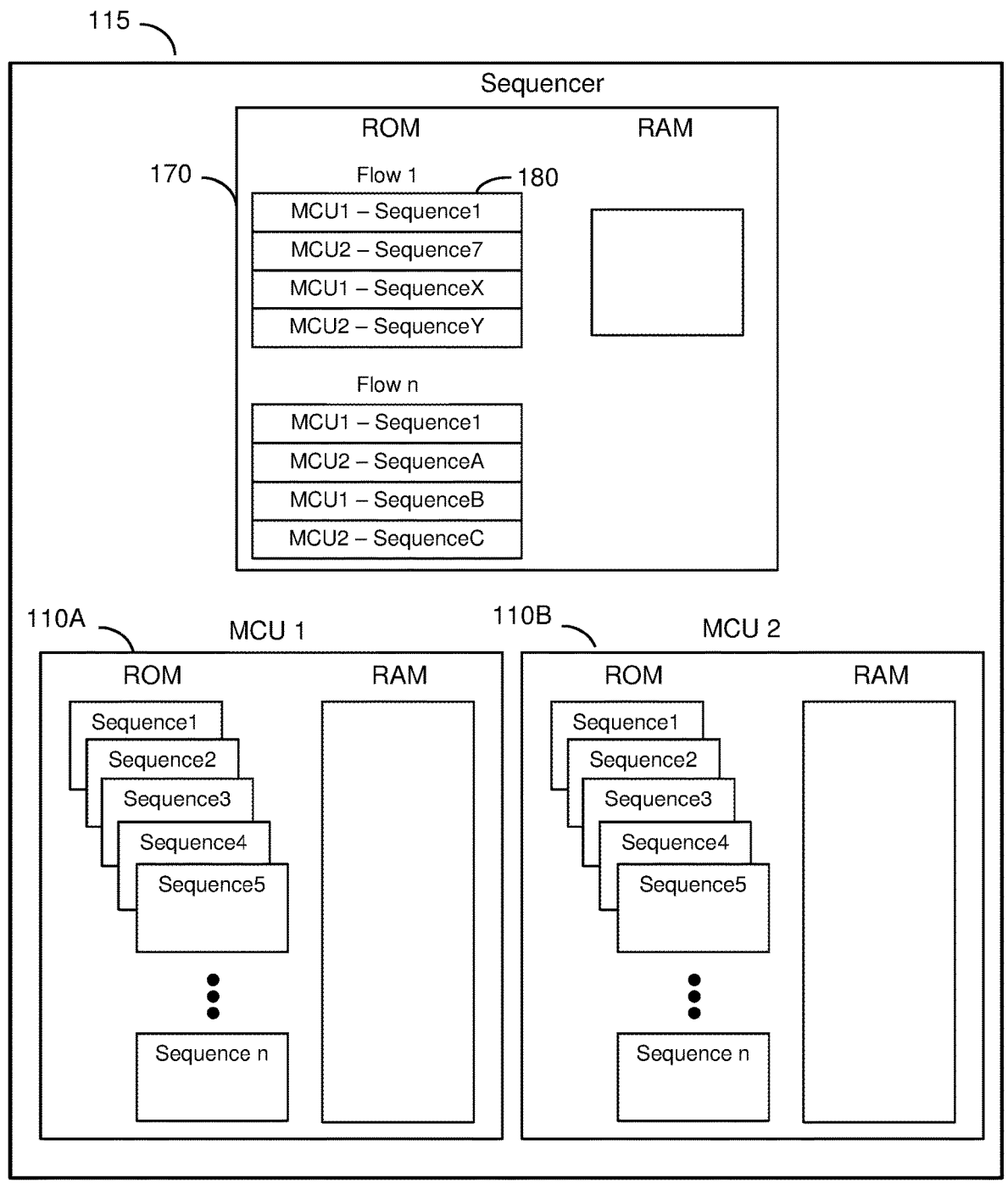

FIGS. 2A and 2B are block diagrams of an IoT device 115 according to the current embodiment. As shown in FIG. 2A, the IoT device includes a sequencer 170 and two microcontrollers, 110A and 110B, where each of the microcontrollers and the sequencer includes a ROM and a RAM, the ROM storing a set of sequences (i.e., sequences of instruction) which are pre-programmed, e.g., during the manufacturing process prior to silicon takeout. In an embodiment, the RAM of the IoT device 115 may or may not be used to store data or instructions, based on the amount of energy available to the device 115 at a given time, and may be used while executing the sequences.

A sequencer flow includes several of the pre-programmed microcontroller sequences running in a particular order one after the other, called a flow. A gateway 140 that is connected to a cloud server, e.g., via a network as shown in FIG. 1, is configured to determine which flow the IoT device 115 will execute by sending a flow sequence to the sequencer 170 of the IoT device 115. In an embodiment, a list of flows is kept in the cloud, e.g., in the cloud server 130 of FIG. 1, such that the gateway 140 can query the available flows and determine which flow should be executed on demand or at predetermined intervals, where the flow is then sent to the sequencer 170 of the IoT device 115 for execution. In a further embodiment, a set of pre-programmed flows are stored within the sequencer 170, and the gateway 140 is configured to retrieve, e.g., from the cloud server 130, and send, e.g., to sequencer 170, a selection of which of the pre-programmed flows are to be executed.

It should be noted that the device 115 is shown with two microcontrollers 110A and 110B for simplicity. However, no limitation to the number of microcontrollers is implied, and the present disclosure includes a device 115 having any number of microcontrollers.

FIG. 2B shows a more detailed view of the device 115. The sequencer 170 may retrieve one or more flows, e.g., Flow 1, Flow 2, Flow n. In an embodiment, the flows are retrieved from a cloud server, e.g., the cloud server 130 of FIG. 1. The flow may include a reference to one or more of the pre-programmed sequences of the microcontrollers, where each reference of the flow also includes an indication of which microcontroller is to execute that sequence. Thus, as shown in Flow 1, 180, of FIG. 2B, a first Sequence1 is to be executed by the first microcontroller 110A, a second Sequence7 is to be executed by the second microcontroller 110B, and so on.

In a further embodiment, the sequencer 170 has stored thereon, e.g., within the sequencer 170 ROM, a set of pre-programmed sequences, or flows, to be executed by the microcontrollers 110A and 110B. The gateway 140 retrieves, e.g., from a cloud server 130, references to which of the pre-programmed flows are to be executed, which is related to the IoT device 115.

The order at which the sequences within the flows are assigned to various microcontrollers may depend on the energy currently available at each of the microcontrollers, the number of sequences in total requires to be executed, the speed and power at which each microcontroller is predicted to be completed each sequences, and so on.

Because the flows are either retrieved from a remote location, e.g., the cloud server 130 of FIG. 1, or permanently stored within the components of the IoT device 115, e.g., the ROM of the sequencer and the microcontrollers, and are merely referenced therefrom, they are not required to be actively written and stored within a local memory on the IoT device 115, e.g., within non-volatile memory. Rather, the IoT device 115 can be fully powered down when not in use to preserve power. It should be emphasized that the IoT device 115 does not require any non-volatile memory to store and/or execute software code by the microcontrollers 110A, 110B, as such software code (e.g., flows) are retrieved on-the-fly from the cloud server 130.

Figure 3:
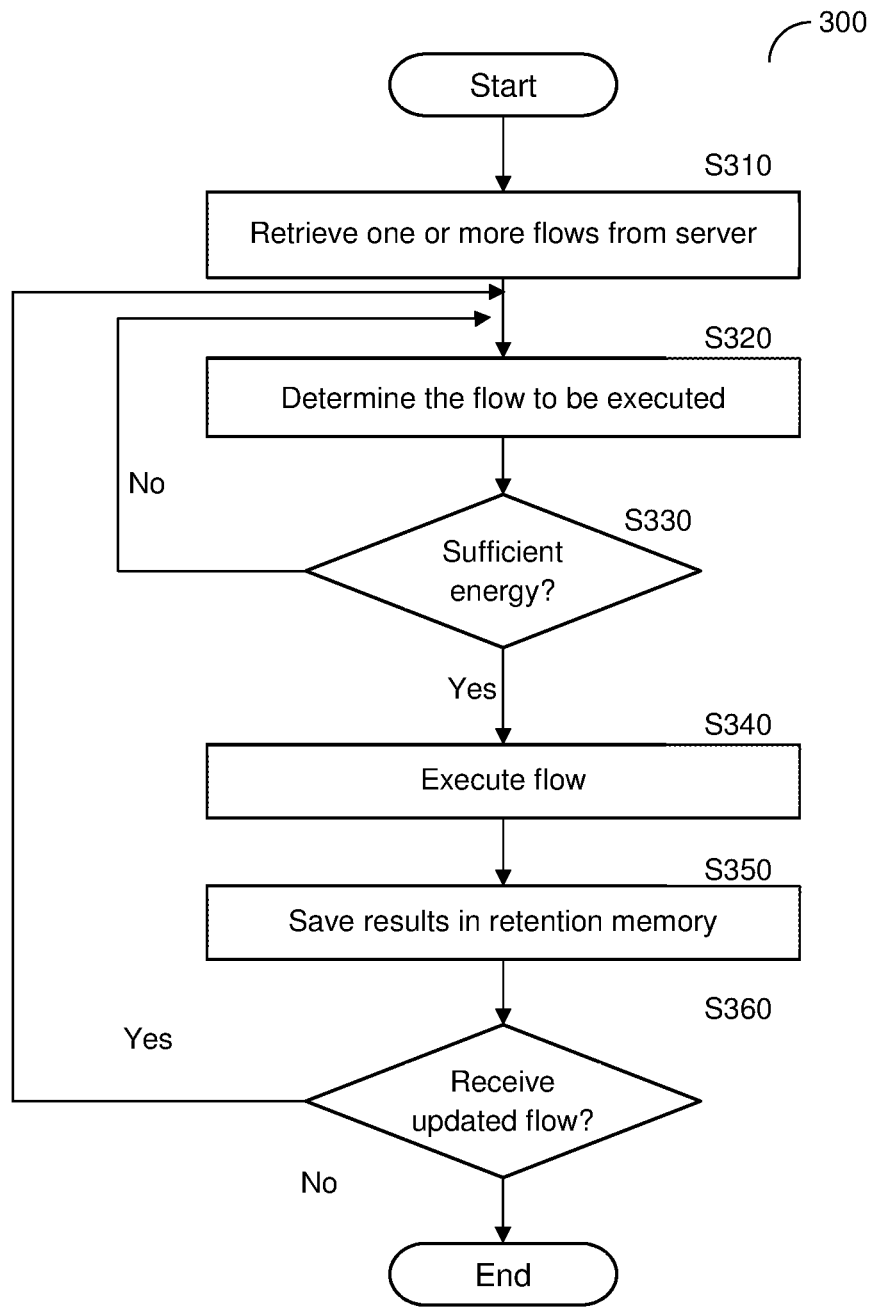
FIG. 3 is an example flowchart illustrating a method for executing a flow according to an embodiment.

FIG. 3 is an example flowchart 300 illustrating a method for executing a flow according to an embodiment. At S310, one or more flows are retrieved. The flow indicates a sequence to be executed, e.g., by a device, and may include the order of the sequence as well as which microcontroller within the device is to execute each sequence. In an embodiment, the flow is retrieved from a cloud server.

At S320, at least one of the retrieved flows is determined to be executed. The determination may be based on predetermined guidelines, or may be determined in real time, e.g., by a device, by a remote server, by an operator, and the like.

In an embodiment, the determination is based on predetermined time intervals, such that certain flows are to be executed at set times.

At S330, it is determined if there is sufficient energy available for each of the microcontrollers to execute their assigned sequences of the flow. If not enough energy is available, the method returns to S320 until sufficient energy is available. Otherwise execution continues at S340, where the flow is executed.

At optional S350, the results of the flow, e.g., data recorded from sensors, results from actuators, and the like, are stored, e.g., within a retention memory of the device executing the flow.

At optional S360, it is determined if an updated flow, e.g., based on the results of the already execute flow, is to be received, and if so, a new flow to be executed is determined at S320 and the process continues. Otherwise, execution ends.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A battery-less internet of things (IoT) device, comprising:
    at least two microcontrollers configured to execute one or more pre-programmed sequences;
    an energy storage for storing energy received from an energy harvester, wherein the energy storage can only provide sufficient energy to operate the microcontrollers intermittently; and
    a sequencer configured to retrieve, from a cloud server, at least one flow, wherein the at least one flow indicates an order of the pre-programmed sequences to be executed and which of the at least two microcontrollers are to execute each of the pre-programmed sequences of the at least one flow when it is determined that there is sufficient energy in the energy storage for a microcontroller specified to execute a next specified pre-programmed sequence of the at least one flow to execute the next specified pre-programmed sequence of the at least one flow.

2. The IoT device of claim 1, further comprising:
    a retention memory configured to retain data associated with execution of the flow, wherein the retention memory is continuously powered on.

3. The IoT device of claim 1, wherein the cloud server is a resource external to the IoT device, and wherein the cloud server is accessed using a network interface.

4. The IoT device of claim 3, wherein each of the at least two microcontrollers is further configured to: execute at least one of the pre-programmed sequences based on energy available in the energy storage.

5. The IoT device of claim 1, wherein each of the at least two microcontrollers further includes: a read only memory (ROM) for storing the one or more pre-programmed sequences and the at least one flow.

6. The IoT device of claim 1, wherein each of the at least two microcontrollers does not execute a software stored in a non-volatile memory.

7. The IoT device of claim 6, wherein the sequencer is configured to retrieve a selection of the at least one flow to be executed from the cloud server.

8. The IoT device of claim 1, wherein communication between the IoT device and the cloud server is through a gateway, wherein the gateway is connected in a same network as the IoT device.

9. A method for executing a sequence of functions by at least two microcontrollers powered by an energy storage for storing energy received from an energy harvester, wherein the energy storage can only provide sufficient energy to operate the microcontrollers intermittently, the microcontrollers being operable in a battery-less internet of things (IoT) device, comprising:
    retrieving, from a cloud server, at least two flows, each flow representing execution of one or more pre-programmed sequences, wherein each of the at least two flows includes an order of the pre-programmed sequences to be executed and which of at least one two microcontrollers is to execute each of the pre-programmed sequences;
    determining which of the at least two flows is to be executed; and
    executing sequentially the pre-programmed sequences as specified in a portion of the determined flow as it is determined that there is sufficient energy to execute the portion of the at least one flow.

10. The method of claim 9, further comprising:
    saving results of the determined flow.

11. The method of claim 9, wherein determining which of the at least two flows is to be executed is based on predetermined time intervals.

12. The method of claim 9, wherein determining which of the at least two flows is to be executed is based on available power.

13. The method of claim 9, further comprising:
executing an updated flow, wherein the updated flow is based on results of the executed determined flow.

14. The method of claim 9, wherein each of the least two microcontrollers does not execute a software stored in a non-volatile memory.

15. The method of claim 9, wherein the cloud server is a resource external to the IoT device, and wherein the cloud server is accessed using a network interface.

16. The method of claim 15, wherein communication between the IoT device and the cloud server is through a gateway, wherein the gateway is connected in the same network as the IoT device.

17. A non-transitory computer readable medium having stored thereon instructions for causing a processing circuitry made up of at least two microcontrollers powered by an energy storage for storing energy received from an energy harvester, wherein the energy storage can only provide sufficient energy to operate the microcontrollers intermittently to perform a process, the process comprising:
retrieving, from a cloud server, at least two flows, each flow representing execution of one or more pre-programmed sequences, wherein each of the at least two flows includes an order of the pre-programmed sequences to be executed and which of at least one two microcontrollers is to execute each of the pre-programmed sequences;
determining which of the at least two flows is to be executed; and
executing sequentially the pre-programmed sequences as specified in a portion of the determined flow as it is determined that there is sufficient energy to execute the portion of the at least one flow.

* * * * *